(12) United States Patent
Higginson

(10) Patent No.: US 8,881,923 B2
(45) Date of Patent: Nov. 11, 2014

(54) SEALABLE CONTAINER HAVING A LID

(76) Inventor: Mark Christopher Higginson, Chorley (GB)

( * ) Notice: Subject to any disclaimer, the term of this patent is extended or adjusted under 35 U.S.C. 154(b) by 847 days.

(21) Appl. No.: 13/128,715

(22) PCT Filed: Oct. 29, 2009

(86) PCT No.: PCT/GB2009/051457
§ 371 (c)(1),
(2), (4) Date: Jul. 27, 2011

(87) PCT Pub. No.: WO2010/058192
PCT Pub. Date: May 27, 2010

(65) Prior Publication Data
US 2011/0278290 A1  Nov. 17, 2011

(30) Foreign Application Priority Data

Nov. 18, 2008 (GB) .................................. 0821051.0

(51) Int. Cl.
*H02G 3/08* (2006.01)
*H02G 3/14* (2006.01)
*B65D 45/16* (2006.01)
*B65D 43/02* (2006.01)

(52) U.S. Cl.
CPC ...... *H02G 3/088* (2013.01); *B65D 2543/00296* (2013.01); *B65D 2543/00805* (2013.01); *B65D 2543/0074* (2013.01); *B65D 2543/00537* (2013.01); *B65D 2543/00101* (2013.01); *B65D 2543/00574* (2013.01); *B65D 2543/00648* (2013.01); *H02G 3/14* (2013.01); *B65D 2543/00694* (2013.01); *B65D 43/0212* (2013.01)
USPC ........... 220/3.8; 220/4.02; 220/324; 174/563; 29/469

(58) Field of Classification Search
CPC ............. H02G 3/14; H02G 3/16; H02G 3/08; H02G 3/085; H02G 30/83; H02G 3/081
USPC ........... 220/324, 315, 4.02, 3.8, 3.2; 174/563, 174/562, 561, 560, 559, 520; 29/469, 428
See application file for complete search history.

(56) References Cited

U.S. PATENT DOCUMENTS

| 3,510,023 | A | 5/1970 | Ullman et al. |
| 3,858,755 | A | 1/1975 | Tellen |
| 4,365,723 | A | 12/1982 | Palermo et al. |
| 6,362,419 | B1 | 3/2002 | Gallagher et al. |
| 6,364,152 | B1 | 4/2002 | Polinski et al. |
| 2003/0000720 | A1 | 1/2003 | Sato |

FOREIGN PATENT DOCUMENTS

| EP | 1622280 A | 2/2006 |
| FR | 2705857 A | 12/1994 |
| GB | 1415242 A | 11/1975 |

*Primary Examiner* — Robert J Hicks
(74) *Attorney, Agent, or Firm* — The Webb Law Firm

(57) ABSTRACT

A container and a lid are connected together in a sealing arrangement. Opposed sides of the lid and container are connected together by side catches. Opposed ends of the container are connected together by end catches different from the side catches. Use of either of the catches effects the seal around the periphery of the container.

12 Claims, 6 Drawing Sheets

SEALABLE CONTAINER HAVING A LID

BACKGROUND OF THE INVENTION

1) Field of the Invention

The present invention relates to a container arrangement and to a method of connecting a container and lid to form a container arrangement. The present invention is particularly, although not exclusively, applicable to an outdoor container arrangement for housing electrical connections with cables extending into and out of the container through ports that can be sealed.

2) Description of the Prior Art

When using a power equipment outdoors it is important that electrical connections be sealed from the environment. This importance is all the more the case where electrical appliances may be plugged in or used in wet weather conditions. It is known to have a lid and box arrangement that house an electrical socket with cables going in and out of the box. However, the sealing arrangement is not always satisfactory.

EP 1 622 280 provides a cover body 3 that pivots on a casing body 2. To effect the seal locking wings 37a, b and c have to be pivoted such that locking holes 38 on the wings extend over locking protrusions 24 on the casing body. Accordingly, wings have to be moved to effect the seal.

U.S. Pat. No. 3,858,755 provides a tamperproof device. No seal is disclosed. A cover 3 has hinged feet 7 that engage with a box body 1 to allow the cover 3 to pivot towards the body. A separate member 10 is pivotally connected to the cover. As the cover 3 finally approaches the box body 1 a cam surface 15 of the member 10 rides over a flange 4 with a shoulder 16 subsequently springing back beneath the flange 4 to hold the cover to the body. The spring force is effected by a U-shaped spring 18 integral with the member 10 being able to flex. Unlatching requires the use of a specialised separate tool.

U.S. Pat. No. 6,362,419 provides a tamperproof device. No seal is disclosed. A cover 12 is brought down onto a base 14. Connection is effected by rotating the head 52 of a bolt 50 against the bias of a spring 56. The spring 56 drives the cover 12 to the right to tuck a tongue 22 of the cover under a lip 94 of the base 14 to make a tight penetration-proof joint.

U.S. Pat. No. 4,365,723 discloses a metal housing with a cover 34. An upper portion of the cover member 34 is moved into place by resting the upper portion against partial front walls 20 and 22 and sliding the cover member upwardly and then moving the lower part of the cover member 34 inwardly so that a flange 38 moves over a top edge 24 of the front wall 18.

SUMMARY OF THE INVENTION

It is an object of the present invention to attempt to overcome at least one of the above or other disadvantages.

According to one aspect of the present invention a container arrangement includes a container and a separate lid. The lid and container may be arranged to be detachably connected together by operating first and second different types of catches, the lid, when connected to the container, being in a sealing relationship with the container.

The lid and container may be arranged to be detachably connected in a sealing relationship when only the first type of catches are operated or, alternatively or additionally, when only the second type of catches are operated.

At least one of the lid or the container may include a peripheral seal which is arranged to cooperate with a periphery of the other of the lid or container when in a sealing relationship.

The lid and container may be arranged to be detachably connected in a sealing relationship when only the second type of catches are operated.

The first catch may be arranged to be pivotally connected to one of the lid or container and may be arranged to move pivotally and may be arranged to flex when the lid and container are being connected. The first catch, when the lid and container are connected, may be arranged to have been flexed beyond its natural flexure to exert a biasing force urging the container and lid into sealing engagement. The first catch may be arranged to act between the container and lid along one side of the container and lid. The first catch may be arranged to act directly along substantially one complete side of the container and lid. The arrangement may include two first catches arranged to act between the lid and container along opposed sides of the container.

The second type of catch may be located on one of the lid or container and may be integrally moulded with one of the lid or container. The second type of catch may comprise a snap fit and may include a ramp that assists in effecting the snap fit by urging at least part of one portion of the lid or container away from another portion of the other of the lid or container where the lid and container are urged towards each other. The second type of catch on the lid or container may act to effect connection by an edge of the catch moving past and extending under an edge of the lid or container.

The first type of catch may be arranged to connect opposed sides of a quadrilateral container arrangement and the second type of catch may be arranged to act on opposed sides of a quadrilateral container.

When the arrangement includes at least one port through which, in use, an electrical cable may extend, at least one second type of catch may be co-extensive with an edge region of the port. Where there are a plurality of such ports there may be a single catch in the region of adjacent edges of adjacent ports and the single catch may at least partially overlap at least one port but not another port in the longitudinal direction of that side. There may be a series of ports adjacent to each other with a single catch being located at each end region of the series and a single catch in the region of adjacent edges of each adjacent port.

The present invention also includes a method of detachably connecting a container and lid to form a container arrangement and to seal the lid and container together by using at least one of a first or second different type of catch.

The method may comprise sealing the lid and container together with only one type of first or second catch.

The first type of catch, which is different from the second type of catch, may not be integrally formed with either of the lid or container, and, alternatively or additionally, may not be caused to be engaged when the lid and the container are moved towards each other.

According to another aspect of the present invention a container arrangement includes a container and a separate lid, the lid and container being arranged to be detachably connected by catches in a sealing relationship with the lid and container including at least one port in the region of the junction between the lid and container through which, in use, an electrical cable may extend, the port including a resilient member on at least one of the lid or container extending across the port which is arranged to form a seal at the port when the lid and container are connected, the catches being spaced from each other along the side of the container arrangement including the port and being arranged to be engaged in the region of the port.

The lid and container may be arranged to be detachably connected in a sealing relationship by first and second different types of catches. The lid and container may be arranged to be detachably connected in a sealing relationship when only the first type of catch is operated or alternatively or additionally, when only the second type of catch is operated.

At least one of the catches in the longitudinal direction of the side including the port may be adjacent to the port and may be adjacent and spaced from the port or may overlap the port partially or completely or alternatively or additionally at least one end of the catch in the longitudinal direction of the side may be aligned with the end of the resilient portion.

The number of catches along the side having the port may be greater in the region of the port than they are in at least one region of that side not in the region of the port.

The container arrangement may include a plurality of ports along one side. A single catch may be located in the region of the adjacent edges of adjacent ports. A single catch may at least partially overlie at least one port but not the other port in the longitudinal direction of that side.

The side may include a series of ports adjacent to each other with a single catch at each end region of the series and a single catch in the region of adjacent edges of adjacent ports in the longitudinal direction of the side.

The container arrangement may include a series of catches on a side opposed to that having the or each port. There may be less catches on the opposed side than that containing the or each port. At least one catch on the opposed side may be directly opposite a port region of the other side and may be adjacent but spaced from the port or overlap at least part of the port partially or completely or both in the direction across the container. Alternatively or additionally, at least one end of the catch in the longitudinal direction may correspond to at least one end of the port on the opposed side.

There may be less catches on the side opposed to that having the or each port than that having the ports.

At least one resilient member may extend up to at least one peripheral seal between the lid and container.

The resilient member may be located on both the lid and container and opposed resilient members on the lid and container may be arranged to be at least partially coextensive in the region of the or each port when the lid and container are connected.

At least one catch may be integrally moulded with one of the lid or container.

At least one catch may comprise a snap-fit. The catch may include a ramp that assists in effecting the snap-fit by urging at least one portion of the lid or container away from another portion of the lid or container when the lid and container are urged towards each other. The catch on the lid or container may act to effect connection by an edge of the catch moving past and extending under an edge of the lid or container.

The catches along the side of the container arrangement having the or each port may be a different type of catch from that used to secure opposed ends of the container arrangement.

The container arrangement may be portable.

BRIEF DESCRIPTION OF THE DRAWINGS

The present invention may be carried into practice in various ways but one embodiment will now be described, by way of example, and with reference to the accompanying drawings, in which:—

DETAILED DESCRIPTION OF THE PREFERRED EMBODIMENTS

Figure 1:
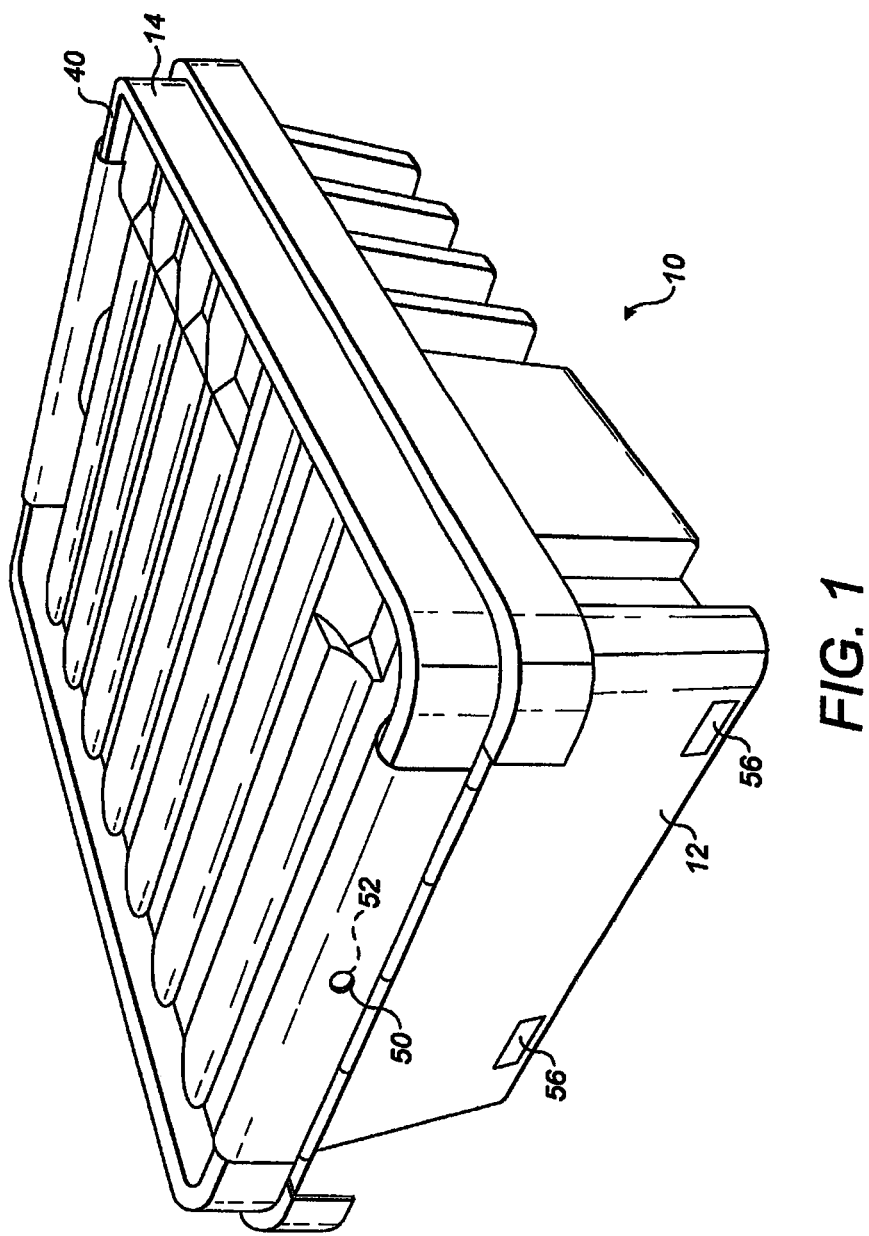
FIG. 1 is a front perspective view of the container arrangement from above and one side.
Figure 2:
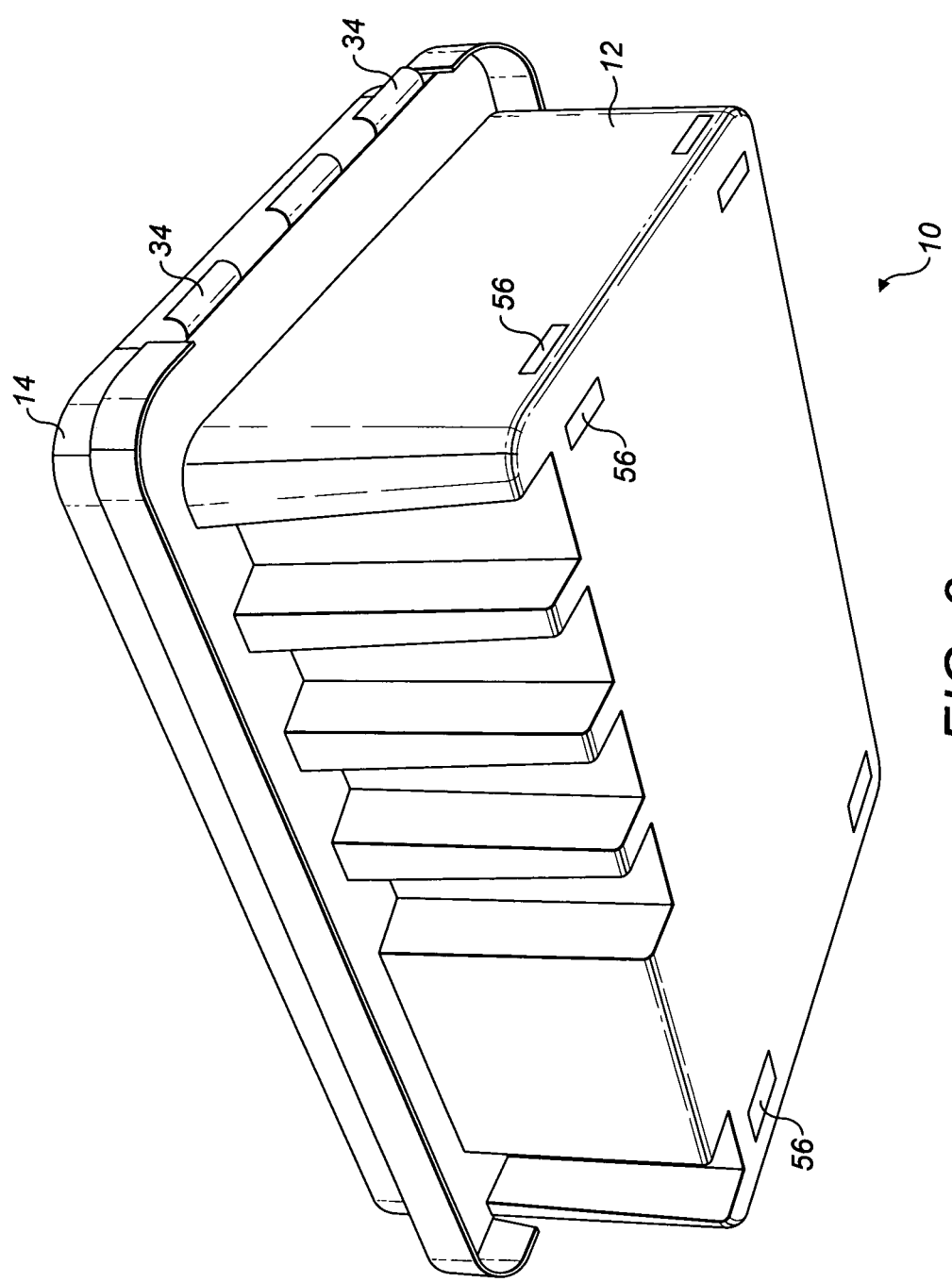
FIG. 2 is a front perspective view of the container arrangement from below and from the other side.

The portable container arrangement 10 comprises a container 12 and a lid 14. The container is intended to house electrical connections (not shown). For instance a mains supply cable may enter through an inlet port 16 shown in FIGS. 3 and 4 and leading to a gang of four sockets. Each socket may have a plug of an electrical appliance inserted with the cables of such plugs leaving the container through different ones of outlet ports 18. The cables leaving the container may be used to power Christmas lights or power tools.

As each cable passes over the side edge of the box it rests against an elastomeric portion 20. In use, when the lid 14 is fastened onto the container, the cables are squashed into the portion 20 with corresponding portions 22 mounted in the underside of the lid 14. In this way the cables are completely surrounded in a watertight manner by the elastomeric portions 20 and 22 along the length of the cable through the portions 20, 22.

The container has an upwardly facing rim 24 around almost the complete circumference. The only gaps in the rim occur at the ports 16 and 18. The lid 14 has a downwardly facing recess 26 around the complete periphery. An elastomeric seal 28 is located in the recess 26. In use, the seal 26 is biased towards and seals with the rim 24.

Figure 3:
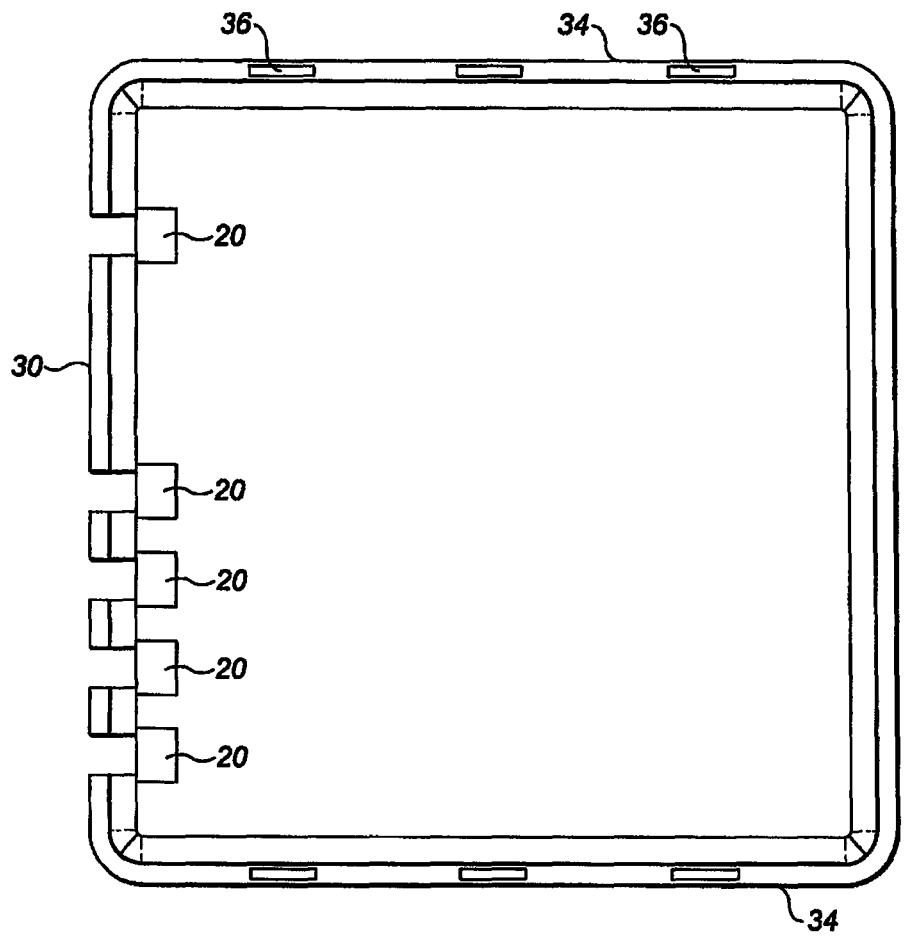
FIG. 3 is a plan view of the container shown in FIGS. 1 and 2 without the lid.
Figure 4:
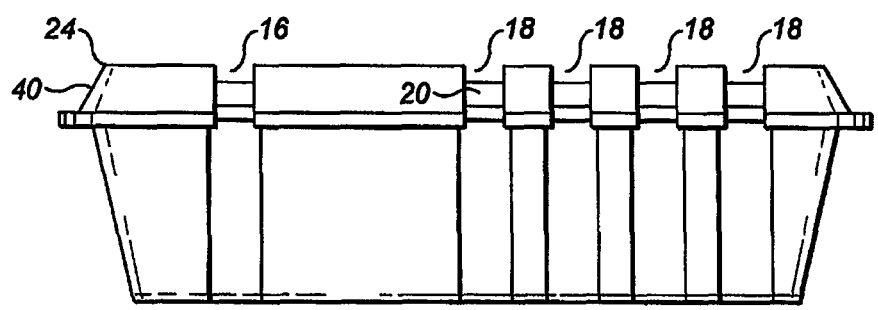
FIG. 4 is a front view of FIG. 3.
Figure 7:
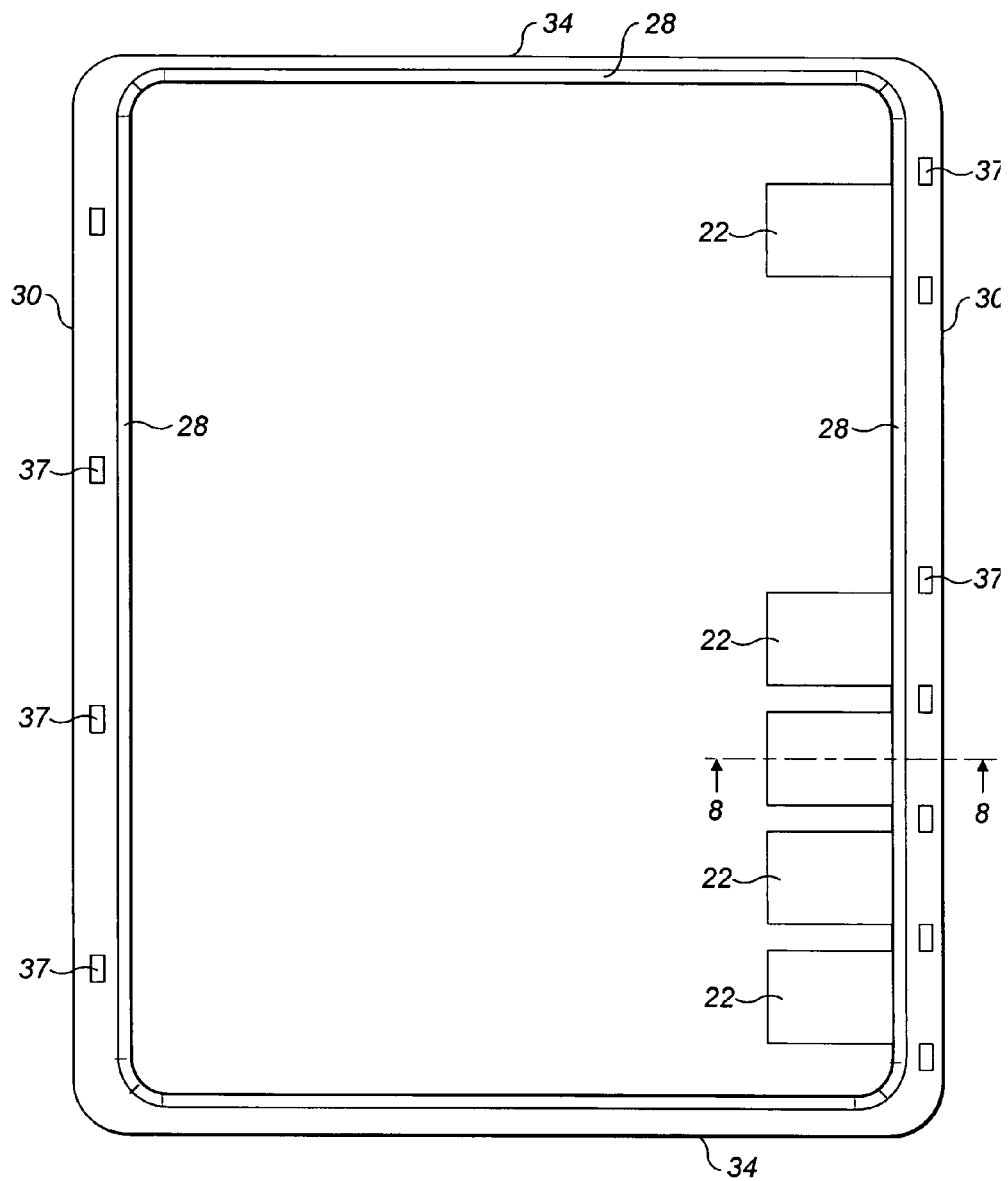
FIG. 7 is an underneath view of the lid.
Figure 8:
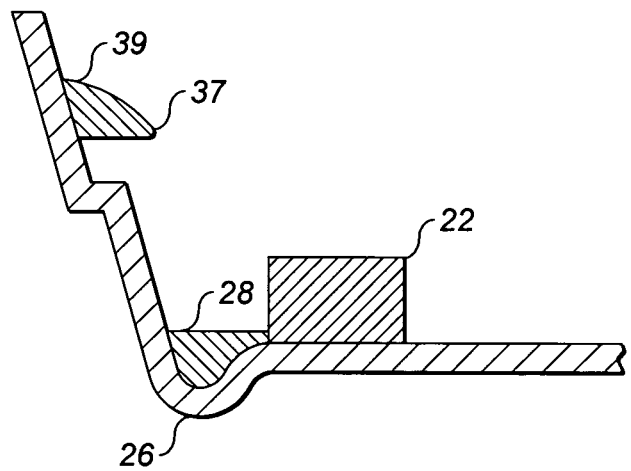
FIG. 8 is a cross-sectional view along the line 8-8 of FIG. 7.

When the lid is biased towards the container to cause the rim 26 to be sealed to the lid 14 sealing also occurs in the region of the ports. As seen in FIG. 3, in the direction of the length of the side 30, the elastomeric portions 20 extend over and beyond each end of the ports 16 and 18. As seen in FIGS. 7 and 8, the elastomeric portions 22 in the lid extend up to the seal 26 and their position and length correspond to the position and length along the side of the container to the portions 20 of the container. Consequently, as the lid is biased towards the container, the elastomeric portions 20 and 22 are biased towards each other and seal against each other beyond each port 16 and 18 and over the extent of each port regardless of whether a cable extends through the port or not.

The container arrangement has two separate end catches 32 that can be used to fasten each end 34 of the container and lid. In addition, the lid 14 has a series of side catches 37.

Either of the end catches 32 or the side catches 37 may serve to adequately seal the lid to the container. However, with both the side and the end catches in operation an even more effective seal around the complete periphery may be achieved.

In some circumstances, such as where the weather is dry or when the rain is light, the end catches alone or the side catches alone may be effected. In other circumstances, such as when the rain is heavy or when electrical equipment is to be stored in the container for a long period both the side and end catches may be used.

The operation of the end catches 32 will be described first.

Figure 5:
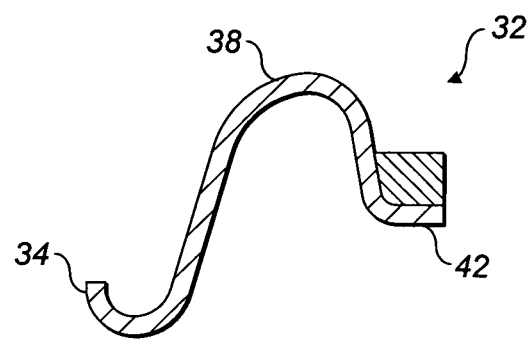
FIG. 5 is a side view of a catch that is used to hold the lid on the container at an end of the container.
Figure 6:
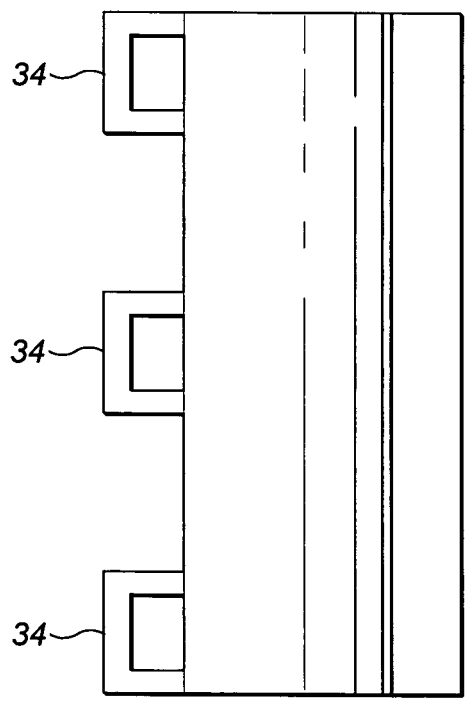
FIG. 6 is a plan view of the catch.

As seen in FIGS. 5 and 6 the end catch 32 is in the form a sine wave. In the position in which the catch holds the lid on the container, three spaced upwardly projecting hinges 34 extend through corresponding openings 36, shown in FIG. 3, in the container ends. The upper cap 38 of the catch 32 acts to bear against the top domed end 40 of the lid to hold the lid on the container and to bias the lid onto the container.

In order to attach the catch and to hold the ends of the lid the lid is first loosely mounted on the container. Then, with the catch 32 inverted from the position shown in FIG. 5, the hinges 34 are located through the openings 36 in the container. The catch is then pivoted upwardly about the hinge 34 until what is then an upwardly and inwardly extending wall 42 of the catch abuts an outwardly facing surface of the domed end 40 of the lid. Further urging of the catch in the rotational direction causes the wall 42 to slide over and up the domed end 40 with the cap 38 flexing to open the curve shown in FIG. 5. As the end wall 42 passes over the top of the dome the catch snaps into position. The opened curve of the cap 38 partially returns to the at rest position shown in FIG. 5. The resilience of that partial return coupled with a stretching of the sine wave shown in FIG. 5 holds the lid firmly against the container 12.

Figure 9:
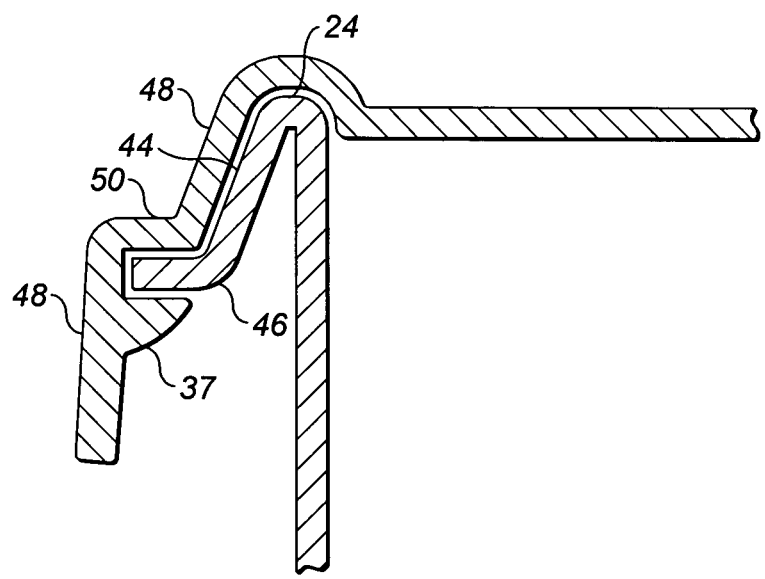
FIG. 9 is a sectional view showing the retainment of the lid on the container at one side.

The operation of the side catches 37 will now be described with reference to FIGS. 7 to 9.

Along the sides of the container the wall from the rim 24 a flange 44 extends downwardly and outwardly terminates in an outwardly facing lip 46. The sides of the lid extend downwardly and outwardly in a flange 48 from the recess 26 with a kink 50 allowing the flange to extend over the end of the lip 46 and down below the lip 46. Where the flanges 44 and 48 are co-extensive they lie against each other or are closely spaced from each other. If only the end catches 32 are attached then there may be sufficient sealing along the sides for most applications without applying the side catches. However the side catches 37 can be applied by a user urging their fingers around the end of the flange 48 to push the sides of the container in and at the same time pulling the flange 48 down and out and then back in to cause the catches 48 to be flexed under the lip 46 to the position shown in FIG. 9. Attachment is further enabled by the catches having ramps 39 that assist in urging the lip and flange apart as the lid is pushed down. The flexure of the flanges 48 holds the sides of the lid down against the rim 24 of the container to effect a firm sealing along the sides of the container. The side catches are released by flexing the flanges 48 outwardly.

There are several catches along each side of the lid.

On the side of the lid opposed to the sides of the container having the ports 16 and 18 there are four catches 37. At one end of the side catch the catch 37 is in line with the elastomeric portion 22 that in use seals the port 16. The space between that end catch 37 and the adjacent catch is greater than the space between other adjacent catches. In this way the concentration of the catches on the opposed side corresponds to the concentration of the elastomeric portions on the opposed side.

On the side having the elastomeric portions 22 there are seven catches. The catches 37 in the region of the elastomeric portion 22 that seals the port 16 partly overlap each elastomeric portion in the elongate extent of that side. The remaining catches are in the region of the other four elastomeric portions 22. The catch 37 towards the end of that side is co-extensive with the end part of each elastomeric portion 22. The next three catches along the side partially overlap the end part of the next three elastomeric portions 22. The final catch 37 is adjacent to but spaced from the far end of the last elastomeric portion of those series.

Consequently the catches 37 on both sides of the lid, and in particular on the side of the lid having the elastomeric portions 22 are optimised to effect the best seal along each side and for each cable passing through a port.

As an additional safety aspect to prevent vandals or children accessing the contents of the container the catches 32 may have a hole 50 which is aligned with a hole 52 in the overhang of the container 12. Tie wraps in a loop, possibly with a lock, can be passed through these holes to prevent removal of the catches and thereby prevent removal of the lid. The overhang of the lid may also include an aligned opening such that the catches, lid and container are all fastened together at each end.

In a further modification an attachment point is provided at each of the lower corners comprising a passage 56 extending from a lever side at each corner to the base at each corner. Tie wraps (not shown) can be passed through each passage 56 and around a base (not shown) so that the container can not be removed. Locks may be provided for the tie wraps. The container may be mounted off the ground, if required.

The lid and the catches 37 may be integrally moulded and may be moulded of plastics. The container may comprise a moulding such as a moulding of plastics. The catches 32 may be moulded such as of plastics.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A container arrangement including a container and a separate lid, the lid and container being arranged to be able to be detachably connected together by operating at least one first catch and at least one second catch, the lid, when connected to the container, being in a sealing relationship with the container the second catch being located on one of the lid or container, the second catch including a ramp, the ramp being moulded integrally with one of the lid or container; the second catch comprising a snap-fit with the ramp assisting in effecting the snap-fit by urging at least part of one portion of the lid or container relative to another portion of the other of the lid or container away from each other when the lid and container are urged towards each other with the second catch on the lid or container acting to effect connection by an edge of the catch moving past and extending under an edge of the other of the lid of container, with a plurality of the second catches spaced from each other along a side of the container or lid adjacent to at least one port through which a cable may extend.

2. The container arrangement as claimed in claim 1 in which the lid and container are arranged to be in a sealing relationship when only the first type catches are operated.

3. The container arrangement as claimed in claim 1 in which the first catch includes a catch member separable from the lid and container.

4. The container arrangement as claimed in claim 1 including at least one port in the region of the junction between the lid and container through which port, in use, an electrical cable may extend and in which the lid and container are arranged to seal with each other across the port when at least one of the first or second catches are applied, whether or not a cable extends across the port.

5. The container arrangement as claimed in claim 1 including at least one second catch at least partially co-extensive with the port when viewed in the direction of the force exerted by the catch adjacent to at least one port.

6. The container arrangement as claimed in claim 5 in which at least one second catch is completely co-extensive with the port when viewed in that direction.

7. The container arrangement as claimed in claim 4 in which at least one of the lid or container includes a peripheral seal and the seal is arranged to cooperate with a resilient portion of the port when the lid and container are in sealing engagement.

8. The container arrangement as claimed in claim 7 in which both the lid and container include resilient portions in the region of the port that are arranged to cooperate with each other in a sealing relationship when the lid and container are connected.

9. The container arrangement as claimed in claim 4 in which the port is located on one of the sides of the container having the second catch with there being less second catches on the opposed side to that having the port.

10. The container arrangement as claimed in claim 4 including a plurality of ports along one side having a second catch.

11. A method of detachably connecting a lid and container to form a container arrangement with at least one first catch and at least one second catch being able to be used to detachably connect the lid and container, the second catch including a ramp located on one of the lid or container; the ramp being integrally moulded with one of the lid or container, the method comprising detachably connecting the lid and container in sealing relationship with only the second catches by urging the lid and container towards each other to cause the ramp to urge at least one portion of the lid or container relative to another portion of the other of the lid or container away from each other with an edge of the second catch moving past and extending under an edge of the container of the lid or container to effect the connection, and connecting a plurality of second catches that are spaced from each other along a side of the container or lid adjacent to at least one part through which a cable may extend.

12. The method as claimed in claim 11 comprising subsequently enhancing the connection of the lid and container by operating the first catch.

* * * * *

UNITED STATES PATENT AND TRADEMARK OFFICE
CERTIFICATE OF CORRECTION

PATENT NO. : 8,881,923 B2
APPLICATION NO. : 13/128715
DATED : November 11, 2014
INVENTOR(S) : Mark Christopher Higginson It is certified that error appears in the above-identified patent and that said Letters Patent is hereby corrected as shown below:

In the Claims,
Column 7, Line 6, Claim 2, delete "first type" and insert -- first --

Signed and Sealed this
Third Day of March, 2015

Michelle K. Lee
*Deputy Director of the United States Patent and Trademark Office*